United States Patent
Traverso

(10) Patent No.: US 6,339,145 B1
(45) Date of Patent: Jan. 15, 2002

(54) USE OF AMINO AZOIC DYES AS MARKERS OF OIL DISTILLATION PRODUCTS

(75) Inventor: Enrico Traverso, Milan (IT)

(73) Assignee: Societa' Italiana Additivi per Carburanti S.r.l., Pescara (IT)

( * ) Notice: Subject to any disclaimer, the term of this patent is extended or adjusted under 35 U.S.C. 154(b) by 0 days.

(21) Appl. No.: 09/736,022

(22) PCT Filed: Jun. 23, 1999

(86) PCT No.: PCT/EP99/04354

§ 371 Date: Dec. 19, 2000

§ 102(e) Date: Dec. 19, 2000

(87) PCT Pub. No.: WO99/67346

PCT Pub. Date: Dec. 29, 1999

(30) Foreign Application Priority Data

Jun. 25, 1998 (IT) ................................ MI98A001454
Aug. 11, 1998 (IT) ................................ MI98A001881

(51) Int. Cl.⁷ ..................... C09B 29/085; C10L 1/00
(52) U.S. Cl. ................. 534/857; 534/DIG. 2; 8/527; 44/328
(58) Field of Search ............ 534/857, DIG. 2; 44/328; 8/527

(56) References Cited

U.S. PATENT DOCUMENTS

| | | | | |
|---|---|---|---|---|
| 4,011,209 A | * | 3/1977 | De Feo et al. ............... | 534/857 |
| 4,904,765 A | * | 2/1990 | Derber et al. ............... | 534/573 |
| 5,182,372 A | * | 1/1993 | Derber et al. ............... | 534/857 |
| 5,428,137 A | * | 6/1995 | Otsuka et al. ............... | 537/792 |

FOREIGN PATENT DOCUMENTS

| | | | |
|---|---|---|---|
| GB | 2022120 | * | 12/1979 |
| JP | 07/062594 | * | 3/1995 |
| WO | WO 95/17483 | | 6/1995 |
| WO | WO-9517483 | * | 6/1995 |

* cited by examiner

*Primary Examiner*—Fiona T. Powers
(74) *Attorney, Agent, or Firm*—Arent Fox Kintner Plotkin & Kahn, PLLC

(57) ABSTRACT

Amino azoic dyes having general formula (I) wherein: $R^1$ is linear or branched alkyl having from 6 to 20 carbon atoms; $R^2$ and $R^3$ are independently H, $CH_3$, $C_2H_5$, $OCH_3$ or $OC_2H_5$; $R^4$ and $R^5$ are independently H, $CH_3$ or $C_2H_5$; X is H or OH; and Y is hydrogen or poly-isopropxy chain (IA) wherein n is between 1 and 4. They are used as markers of oil distillation product.

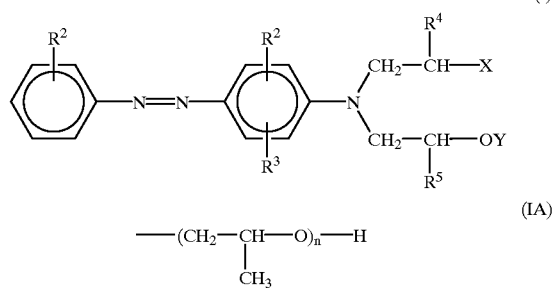

11 Claims, No Drawings

USE OF AMINO AZOIC DYES AS MARKERS OF OIL DISTILLATION PRODUCTS

The present invention relates to the use of aminic azo dyes and their solutions in organic solvents, as pH depending markers of petrols, gas oils and generally for oil distillation products.

Petrols and gas oils are often additioned with small amounts, from 5 to 40 ppm, of liquid compositions of markers, in order to identify the oil product origin or for fiscal reasons.

The markers in many cases are constituted by liquid compositions of azoic dyes in organic solvents, which generally dye the oil products in yellow.

It is known that the marker control and its identification are carried out by treating a small amount of the oil product, depending on the marker, with an hydrophilic solution of a base or of an acid, which optionally can contain an organic solvent miscible with water.

The marker under these conditions undergoes a pH depending reaction with colour change. The extraction solutions assume more or less intense colorations, with a colour ranging from the red to the violet, to blue.

Among the commercial markers extractable in basic medium Mortrace® SB and ST (Morton) can be mentioned. Among those extractable in acid ambient, Sudan Marker® 455 (C.I. Solvent Yellow 124 -BASF) is known. This latter marker has an high absorbance as defined below, but it has the drawback to be synthetized with an industrially very expensive process, which besides the diazo-copulation reaction requires also an additional process step consisting in the condensation reaction with a vinylether.

Furthermore, other azoaminic markers extractable in acid medium, for example those described in the patent application WO 95/17483, are known. Tests carried out by the Applicant have shown that the azoaminic markers in which the nitrogen substituents are aliphatic groups, in the acid solution have a low specific absorbance $E^{1\%}_1$ cm, defined as the absorbance referred to a solution at 1% w/v concentration in a 1 cm cell. See the Examples.

The need was felt to have available markers which in the extraction acid solution have high specific absorbance $E^{1\%}_1$ cm characteristics at the respective wave length of maximum absorption, and obtainable with a simplified process.

The Applicant has unexpectedly and surprisingly found compounds to be used as markers of oil distillation product which overcome the above mentioned drawbacks.

It is an object of the present invention the use as markers of oil distillation product of amino azoic dyes having the general formula

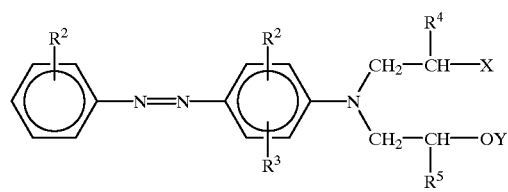

(I)

wherein:
  $R^1$ is linear or branched alkyl with a number of carbon atoms from 4 to 20;
  $R^2$ and $R^3$ are independently H, $CH_3$, $C_2H_5$, $OCH_3$, $OC_2H_5$;
  $R^4$ and $R^5$ are independently H, $CH_3$, $C_2H_5$;
  X is H, OH;
  Y is hydrogen or the following poly-isopropoxy chain

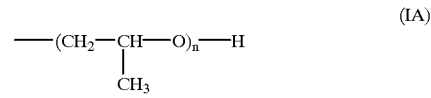

(IA)

wherein n is comprised between 1 and 4; and of their concentrated compositions having a high dry titre in organic solvents, containing from 40 to 100% by weight of said azodyestuffs.

For the use according to the present invention preferably in the formula (I) compounds $R^1$ is $-C_{12}H_{25}$ aliphatic radical or sec.butyl, the $R^2$ and $R^3$ substituents are independently from each other hydrogen, $CH_3$, $OCH_3$; $R^4$ is hydrogen and X is hydrogen or OH, $R^5$ is hydrogen, Y is H or the radical of formula 1a wherein n is comprised between 1 and 3

The organic solvent of the compositions having an high dry titre is selected from aromatic hydrocarbons having a number of carbon atoms from 7 to 15, optionally containing one or more $C_1$–$C_4$ aliphatic chains, and mixtures thereof, or solvents having a greater polarity than that of the above mentioned hydrocarbons, comprising in their molecule one or more functional groups containing oxygen, in which oxygen is bound by covalent bonds, such as for example ethers, alcohols, and/or with double bond=0 such as for example esters, ketones, etc.

Examples of aromatic hydrocarbons usable as azodyes solvents are xylene, alkylnaphthalenes, the aromatic hydrocarbon mixture having from 10 to 11 carbon atoms known as Shellsol® AB; examples of solvents having a polarity greater than that of the aromatic hydrocarbons and comprising in the molecule one or more functional groups containing oxygen are 2-butoxyethanol, butylcellosolve acetate and diacetonalcohol.

According to the object of the present invention the compounds of formula (I) are extracted from the oil product by means of acid solutions of strong, inorganic and/or organic acids, having the following composition (% by volume):
  from 5 to 90% of an aqueous solution of a strong acid, having a molarity equal to or higher than 0.5 M;
  from 95 to 10% of an hydrosoluble organic solvent.

The extraction phase if necessary can be repeated more times in order to completely extract the marker. Examples of strong acids are halohalide acids, sulphuric acid, nitric acid, phosphoric acid; mono-, di-, tri-chloroacetic acid.

Examples of hydrosoluble organic solvents are alcohols such as methylic, ethylic, isopropylic alcohol; polyols as mono-, di-, polyethylenglycols, glycerine; ether-alcohols such as methoxy- ethoxy-, butoxy-ethanol; dimethylformamide, di-methylsulphoxide.

Optionally an additive can be added, soluble in the acid mixed aqueous/organic phase used for the extraction, to decrease the background coloration of the extraction solution. For example a salt in amount from 5 to 20% w/v can be used. Examples are KCl, $CaCl_2$, $ZnCl_2$, $ZnSO_4$, $AlCl_3$.

In the extraction tests carried out by the Applicant to show the advantages obtainable with the use of the present invention markers, in a first series of tests, solutions obtained by diluting in isooctane the marker concentrated liquid compositions up to concentration 5–20 ppm, have been used. These yellow-coloured solutions have a wave length at the absorption peak $\lambda_{max}$ in the range 395–410 nm. The extraction acid solutions have a magenta red colour with $\lambda_{max}$ in the range 530–545 nm. The tests reported in the examples show that the invention markers in the extraction acid solutions have a very high specific absorbance $E^{1\%}_{1}$ cm, the concentration of the azoic compound being equal, in particular higher than 50%, in comparison with the above mentioned azoaminic markers.

For example the specific absorbance $E^{1\%}_{1}$ cm of the N-ethyl-N- (2-hydroxyethyl)-4-[(dodecylphenyl)-azo]-m-toluidine compound, in concentrated liquid composition at concentration 0.1 moles/70 g, is 775 ($\lambda_{max}$=538 nm) in the acid hydroalcoholic solution used for the extraction (HCl 10N/ethanol 50/50 v/v), while the one of the composition containing N,N-diethyl-4-[(dodecylphenyl)-azo]-m-toluidine is 424 ($\lambda_{max}$=535 nm). See Table 1 (in the Table the marker concentrations in the concentrated liquid compositions are 0.1 mole/70 g of composition, calculated by supposing a synthesis yield of In a second series of tests the marker concentrated compositions have been added to the oil product (gas oil for autotraction, see the Examples) to give marker concentrations in the range 0.5–10 ppm. The extraction has been carried out as described above. The extraction solution coloration moves towards $\lambda_{max}$ values lower than the previous ones, up to about 480 nm, towards the red and orange since the background colour is present. However the peak corresponding to the maximum absorption wave length results clearly identifiable also under these conditions.

Without to be bound to any theory, the Applicant thinks that the greater specific absorbance of the markers of the present invention is due to the association between the hydroxyl group which are in the nitrogen substituent aliphatic groups of these compounds and the organic solvent in the extraction solution.

The markers of the present invention have in the extraction solvent an high absorbance comparable, the concentration being equal, with that of Sudan Marker® 455. However the present invention markers are obtainable with a simpler process, as described hereinunder.

It has been found by the Applicant that formula (I) compounds wherein $R^1=C_4H_9$, are extractable also with aqueous acids (ex. HCl 5N). However the solution coloration intensity is lower than that obtained in an aqueous solution in admixture with an organic water-soluble solvent.

The preferred markers are those wherein $R^1$ of formula (I) is a linear or branched alkyl having from 6 to 20 carbon atoms, said compounds having a specific absorbance $E^{1\%}_{1}$ cm in the mixed aqueous/organic extraction solution higher than those markers wherein $R^1=C_4$ alkyl. See Table I.

The present invention markers, or the corresponding compositions in organic solvents having a high dry titre, are added to the oil distillation products in amounts from 0.5 to 50 ppm.

The present invention markers can be used in admixture with other markers and/or dyes used in this field, which are selected among those which do not interfere in the described extraction process.

It is a further object of the present invention compounds of formula (IX):

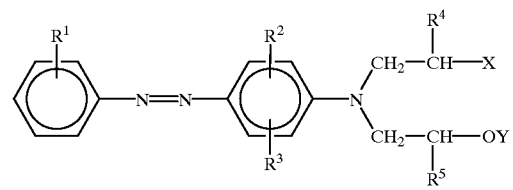

(IX)

wherein:
$R^1$ is linear or branched alkyl with a number of carbon atoms from 6 to 20;
$R^2$, $R^3$, $R^4$ and $R^5$, X and Y are as defined in formula (I).

Said dyes, besides having the advantageous spectrophotometric properties above said over those of the compounds of the same formula wherein $R^1=C_4$ alkyl, are not extracted with aqueous acids. This properties make it possible their use in combination with a blue dye as additives to make petrol green-coloured under the provisions of the Italian Ministerial Decree 6.3.97, that states that said dyes must not be extractable with aqueous acids.

The compounds of formula (I) are synthetized by starting from primary aromatic amines mono-alkyl substituted in the ring and by tertiary aromatic amines N,N disubstituted with alkylic chains containing at least an hydroxyl group.

The aromatic aminic copulating agent for obtaining the compounds of formula (I) when Y is the radical of formula (IA), is prepared by reacting the aromatic amine having one branched alkyl group of formula: —CH$_2$—CH(R$^5$)—OH with the requested number of moles of 1,2-propylene oxide, at a temperature comprised between 140–170° C., in the presence of a base catalyst, such as KOH, CH$_3$ONa, etc.).

The raw materials are easily available on the market. Furthermore, the hydroxylated tertiary aromatic amines used in the present synthesis are not classified as toxic.

The process to obtain the markers, and which allows to obtain contemporaneously also the respective concentrated compositions having a high dry titre in organic solvents, comprises the following steps:

1) diazotization, in hydroalcoholic solution of isopropyl alcohol, with nitrous acid of the primary aromatic amine having the R$_1$ group and obtainment of the corresponding diazonium salt;

2) diazonium salt copulation with the aromatic amine N,N disubstituted with alkyl chains containing at least one hydroxyl group, at 0° C. and at pH between 2 and 5 buffered with a sodium carbonate or a sodium acetate solution, in the presence of an aromatic solvent as defined, from which the formed product is extracted;

3) Recovery of the solution in the organic solvent having a high dry titre ready to be use.

Alternatively to step 3) the solvent can be evaporated at reduced pressure and the product is obtained.

At the end of step 2), after isopropyl alcohol recovery and elimination of the aqueous phase by siphoning, the organic phase is concentrated under vacuum at 115–120° C. and clarified by filtering on sintered filter having an average porosity (G3 porosity). If the final solution is too viscous, the clarification by filtering is carried out before the concentration phase.

Examples illustrating the invention are reported hereinafter, which are not to be considered limitative of the scope of the same.

EXAMPLE 1

Synthesis of N-ethyl-N-(2-hydroxyethyl)-4-[(dodecylphenyl)-azo]-m-toluidine (compound C)

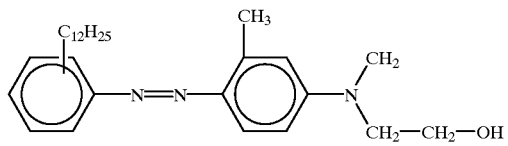

(C)

In a 1 l four-necked flask, with stirrer and dropper, 54.8 g (0.21 moles) of dodecylaniline CAS [68411-48-3], 80 ml of isopropyl alcohol, 63 ml of HCl 10 N and minced ice are introduced.

The aromatic amine diazotization is carried out by adding during one hour, under stirring, by dropping funnel, 73 ml of a 20% $NaNO_2$ w/v aqueous solution. The reaction mixture temperature is maintained at 0° C. with minced ice portions. At the end it is left under stirring for further 20 minutes. The diazonium salt solution has a final volume of 350 ml.

In a 1 litre flask with stirrer, 2 dropping funnels, 35.8 g (0.20 moles) of N-ethyl-N-(2-hydroethyl)-m-toluidine, 100 ml of water, 20 ml of HCl 10 N and 100 ml of Shellsol® AB are introduced. The solution is cooled at 0° C. by mixing with minced ice portions.

To this mixture at the temperature of 0° C. under stirring, the hydroalcoholic solution containing 0.21 moles of the diazonium salt of the dodecylaniline previously prepared, is added in one hour and 30 minutes, by dropping funnel. By means of the other dropping funnel 160 ml of a 20% $Na_2CO_3$ (w/v) solution are contemporaneously added in a total time of 2 hours and 30 minutes. The pH is in the range 2–5.

The reaction mixture is maintained for other 4 hours under stirring, letting the temperature reach the room one. At the end the dropping funnels are taken away and substituted with a vigreux column connected to a claisen condenser. The azeotrope water/isopropylic alcohol is distilled.

Stirring is stopped. The phases are quickly separated and the aqueous phase is siphoned. The organic phase is recovered which is dehydrated by heating to 115° C. in nitrogen flow, under stirring. The solution is successively clarified by filtering on sintered filter (G3), then concentrated by heating at 115° C. at the residual pressure of 30 mmHg.

140 g of a dye solution in Shellsol® AB are thus obtained. The dye solution has a concentration of about 66% by weight.

EXAMPLE 1a

Extraction Test of the Dye C Concentrated Liquid Composition Diluted with Isooctane In a 200 ml separatory funnel are introduced:

50 ml of isooctane containing 22.90 ppm w/v of liquid composition of product C directly obtained from the synthesis and having a calculated concentration of 0.1 mole/70 g, assuming a quantitative reaction yield (100%).

50 ml of extracting solution, obtained by mixing 50 volumes of HCl 10 N with 50 volumes of anhydrous ethanol.

The mass is strongly stirred for 30 seconds. The funnel is let stay. Two layers are quickly separated. The lower acid hydroalcoholic layer intensely colours into magenta red.

The $E^{1\%}_1$ cm and $\lambda_{max}$ values in isooctane and in the extraction solution are reported in Table I.

EXAMPLE 2

Synthesis of N,N-bis(2-hydroxyethyl)-4-[(dodecylphenyl)azo]-m-toluidine (compound D)

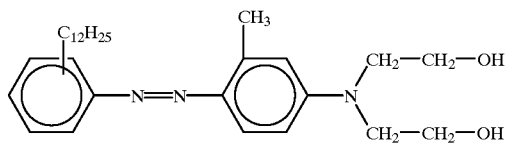

(D)

The compound is synthetized according to the method described in Example 1, using g 54.8 of dodecylaniline (0.21 moles) as diazotable base.

In a 1 litre flask with stirrer, 2 dropping funnels, 39 g (0.20 moles) of N, N-bis(2-hydroxyethyl) m.toluidine, 100 ml of water and 20 ml of HCl 10 N are introduced, stirring until complete dissolution. 100 ml of Shellsol® AB are subsequently added. The solution is cooled at 0° C. by mixing with minced ice.

The same procedure described in Example 1 is followed till to the filtration on sintered filter of the organic phase. After filtering, the phase is diluted with a Shellsol® AB solvent portion used to wash the filter, obtaining 180 g total of solution.

The solvent is completely removed by evaporation up to 120–125° C. and residual pressure of 30 mm Hg, obtaining a residue of tarry consistence weighing 95 g, which is treated with 45 g of diacetonalcohol to give a solution (g 140) having a concentration of about 65%.

EXAMPLE 2a

Extraction Test of the Dye D Concentrated Liquid Composition Diluted with Isooctane One proceeds as described in Example 1a.

The corresponding $E^{1\%}_1$ cm and $\lambda_{max}$ values in isooctane and in the extraction solution are reported in Table I.

EXAMPLE 3

Synthesis of N,N-bis(2-hydroxyethyl)-4-[(dodecylphenyl)azo]-aniline (compound B)

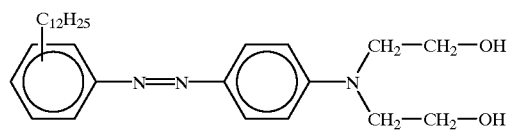

(B)

The process described in Example 2 is followed. Diazotization is carried out on the same base; the copulating agent is N,N-bis(2-hydroxyethyl) aniline.

The final organic solution in Shellsol® AB has a weight of 140 g, the dye concentration is about 62%.

EXAMPLE 3a

Extraction Test of the Dye B Concentrated Liquid Composition Diluted with Isooctane One proceeds as described in Example 1a.

The corresponding $E^{1\%}_1$ cm and $\lambda_{max}$ values in isooctane and in the extraction solution are reported in Table I.

EXAMPLE 4
(comparative)

Synthesis of N-ethyl-N-(2-hydroxyethyl)-4-[(p-sec.butylphenyl-)azo]-m-toluidine (compound 1B)

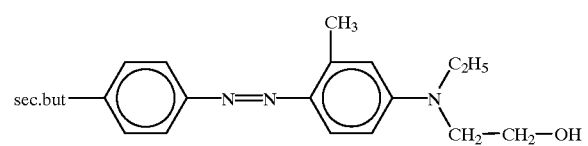

(IB)

By operating with the same procedures of Example 1 and by using 31.3 g of p-sec.butylaniline (0.21 moles) as diazotizable base and 35.8 g (0.2 moles) of N-ethyl-N-(2-hydroxyethyl)-m-toluidine as copulating base, 140 g of liquid composition based on the azoic dye are prepared. The dry product titre is about 50%.

EXAMPLE 4a
(comparative)

Extraction Test of Dye IB Concentrated Liquid Composition Diluted with Isooctane One proceeds as described in Example 1a.

The corresponding $E^{1\%}_1$ cm and $\lambda_{max}$ values in isooctane and in the extraction solution are-reported in Table I.

EXAMPLE 5
(comparative)

Synthesis of N,N-diethyl-4-[(p-sec.butylphenyl)-azo]-m-toluidine (compound IC)

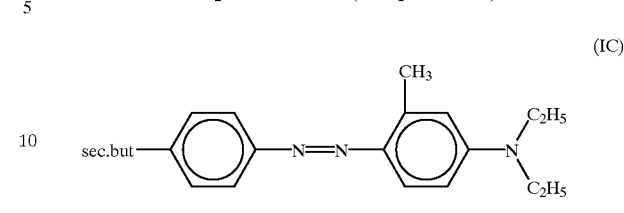

(IC)

By operating with the same procedures of Example 1 and by using 31.3 g of p-sec.butylaniline (0.21 moles) as diazotizable base and 32.6 g (0.2 moles) of N,N-diethyl-m-toluidine as copulating base, 140 g of liquid composition based on the azoic dye are prepared. The dry product titre is 48%.

EXAMPLE 5a
(comparative)
Extraction Test of the Dye IC Concentrated Liquid Composition Diluted with Isooctane One proceeds as described in Example 1a.

The corresponding $E^{1\%}_1$ cm and $\lambda_{max}$ values in isooctane and in the extraction solution are reported in Table I.

EXAMPLE 6
(comparative)

Synthesis of N,N-diethyl-4-[(dodecylphenyl)-azo]-m-toluidine (compound IF)

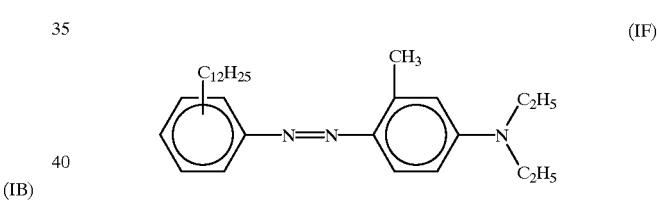

(IF)

By operating with the same procedures of Example 1 and by using 54.8 g of dodecylaniline (0.21 moles) as diazotizable base and 32.6 g (0.2 moles) of N,N-diethyl-m-toluidine (0.2 moles) as copulating base, 140 g of liquid composition based on the azoic dye are prepared having a dry titre of about 65%.

EXAMPLE 6a
(comparative)
Extraction Test of the Dye IF Concentrated Liquid Composition Diluted with Isooctane One proceeds as described in Example 1a.

The corresponding $E^{1\%}_1$ cm and $\lambda_{max}$ values in isooctane and in the extraction solution are reported in Table I.
Exreaction Tests of the Product C Marker (Ex. 1) from Gas Oil For Autotraction

EXAMPLE 7

In a 200 ml separatory funnel 50 ml of gas oil for autotraction charged with 10 ppm w/v of product C liquid composition (Ex. 1) having a concentration of 0.1 moles/70 g, and 50 ml of extraction acid solution, obtained by mixing 25 volumes of HCL 10 N, 20 volumes of water and 55 volumes of ethanol, are introduced.

The mass is strongly stirred for 30 seconds. The funnel is let stay. Two layers are quickly separated. The lower acid hydroalcoholic layer colours red. The absorption spectrum shows a marked and clear peak at $\lambda_{max}$=533 nm.

EXAMPLE 8

In a 250 ml separatory funnel, 150 ml of gas oil for autotraction, charged with 1 ppm w/v of product C liquid composition and 40 ml of extraction acid solution of Example 7, are introduced.

From the mass, strongly stirred, a lower acid hydroalcoholic layer is clearly separated which colours red and which shows a spectrophotometric peak at $\lambda_{max}$=489 nm.

EXAMPLE 9

In a 200 ml separatory funnel, 100 ml of gas oil for autotraction, charged with 5.25 ppm w/v of product C liquid composition, are treated and stirred with 3 subsequent 20 ml parts of extraction acid solution formed by 70 volumes of dimethylformamide and 30 volumes of HCL 10 N.

The three parts are collected as lower phase and mixed together to give a limpid, red-coloured solution which shows a spectrophotometric peak at $\lambda_{max}$=532 nm.

EXAMPLE 10

In a 200 ml separatory funnel, 100 ml of gas oil for autotraction, charged with 0.5 ppm of product C liquid composition, are treated and stirred with 3 subsequent 10 ml parts of extraction acid solution of Example 9.

The three parts are collected as lower phase and mixed together to give a limpid, red-orange-coloured solution having a spectrophotometric peak at $\lambda_{max}$=484 nm.

EXAMPLE 11

In a 200 ml separatory funnel, 100 ml of gas oil for autotraction, charged with 2 ppm w/v of product C liquid composition, are treated and stirred with 40 ml of extraction acid solution consisting of 90 volumes of ethylenglycol and 10 volumes of HCl 10 N.

The limpid and red-coloured extraction solution is separated. It shows an absorption peak at $\lambda_{max}$=495 nm.

EXAMPLE 12

In a 200 ml separatory funnel, 100 ml of gas oil for autotraction, charged with 0.5 ppm w/v of product C liquid composition, are treated and stirred with 20 ml of acid solution of Example 11.

The limpid and red-orange-coloured extraction solution is separated. It shows an absorption peak at $\lambda_{max}$=485 nm.

EXAMPLE 13

Preparation of the aminic copulating agent of formula (13A)

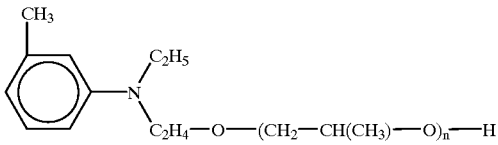

(13A)

wherein n=2.2, mol. wt.=307 (pure product) 358 g (2 moles) of N-ethyl-N(2-hydroxyethyl)-m-toluidine and 9 g of powdered $CH_3ONa$ are charged into 1 liter autoclave equipped with a magnetic stirrer and a heating-cooling jacket with forced oil circulation. The vessel is closed and air is removed by repeated nitrogen washings. Then heating is applied to raise the temperature of the solution to 150° C. In continuum are then charged, by means of a tubing dipped into the organic solution, g 232 (4 moles) of 1,2-propylene oxide. The reaction is exotermic and the temperature in the organic solution is maintained between 150–160° C. by circulating in the vessel jacket oil cooled at room temperature. The reaction lasts 3 hours. The maximun pressure inside the reactor is of 4 $Kg/cm^2$.

The organic solution is then cooled to room temperature. Vacuum is applied in order to remove the gas. The liquid phase is afterwards distilled under vacuum, to eliminate residual N-ethyl-N(2-hydroxyethyl)-m-toluidine: at a temperature comprised between 132 and 160° C. (temperature of the vapor phase) are distilled 42 g of an oil having a nitrogen content of 7.45%. The product left in the vessel is a yellowish oil (g 543) having a nitrogen content of 4.56% corresponding to an average molecular weight of 307, freely soluble in diluted HCl. Said product is used as such in the synthesis of the compound of formula (I) described in following example 14.

EXAMPLE 14

Synthesis of N-ethyl-N(2-polyisopropoxyethyl)-4-[(dodecyl phenyl)azo]-m-toluidine (compound G)

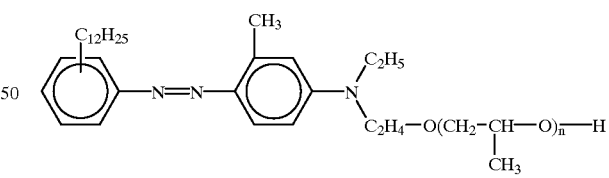

(G)

n=2.2, molecular weight=579

The preparation is made as described in Example 1. In the synthesis is used a quantity of the copulating agent prepared in ex. 13 of g. 61.4 (0.2 moles). g 140 of a very viscous solution of the dye in Shellsol® AB are obtained. Dry content: 83%.

EXAMPLE 14a

Extraction of the Concentrated Liquid Dye Composition of Example 14 with Iso-octane The same procedure as that described in ex. 1a is repeated. In table I are given the corresponding values of $E^{1\%}_1$ cm and $\lambda_{max}$ values in isooctane and in the extraction solution.

EXAMPLE 15

Extractability Test in Aqueous Acid of the Dye of Ex. 1 (Dye C)

An heptane solution at 20 ppm w/v concentration of dye C is prepared by diluting conformingly with said solvent the liquid high dry concentrated dye composition of ex. 1. 10 ml of the heptane solution is shaked in a separatory funnel with 50 ml of aqueous HCl 5N. After phase separation, it is observed that the hydrochloric acid phase remains colourless.

EXAMPLE 16
(comparative)

Extractability Test in Aqueous Acid of the Dye of Ex. 4 (Dye IB)

By performing the same procedure as in preceding example 15, it is observed that the dye is completely extracted by the acid solution.

Note: in following Table I the marker concentrations in the concentrated organic solutions before diluting with isooctane, are of 0.1 mole/70 g of composition, calculated by assuming the theoretical synthesis yield of 100%.

TABLE I

Comparison among the specific absorbances $E^{1\%}_{1\,cm}$ of the invention markers determined at the maximum absorption wave length, respectively in isooctane and in the mixed organic/aqueous extraction solution with the specific absorbances of markers of similar chemical structure which do not instead contain hydroxyl groups in the molecule.

| Product | Isooctane solution $E^{1\%}_{1\,cm}$ | $\lambda_{max}$ | Mixed aqueous/organic extraction solution $E^{1\%}_{1\,cm}$ | $\lambda_{max}$ |
|---|---|---|---|---|
| IB (ex. 4 comp.) | 440 | 405 | 694 | 536 |
| B (ex. 3) | 411 | 399 | 735 | 540 |
| C (ex. 1) | 434 | 406 | 775 | 538 |
| D (ex. 2) | 429 | 405 | 752 | 541 |
| G (ex. 14) | 423 | 410 | 740 | 538 |
| IC (ex. 5 comp.) | 382 | 412 | 383 | 533 |
| IF (ex. 6 comp.) | 420 | 413 | 424 | 535 |

TABLE II

Ratio between the specific absorbances $E^{1\%}_{1\,cm}$, determined in the mixed aqueous/organic extraction solution of the marker of the invention to those of the markers of the comparative examples (ref. Table I)

| | Ratio $E^{1\%}_{1\,cm}$ |
|---|---|
| IB/IC | 1.81 |
| B/IF | 1.73 |
| C/IF | 1.82 |
| D/IF | 1.77 |
| G/IF | 1.74 |

What is claimed is:

1. A method for marking oil distillation products by adding to said oil distillation products an amino azoic dye compound of formula

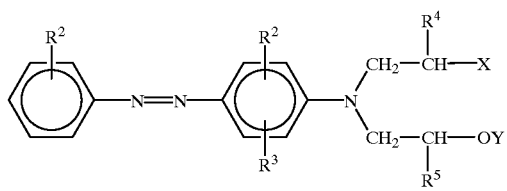

wherein:
R$^1$ is linear or branched alkyl having from 6 to 20 carbon atoms;
R$^2$ and R$^3$ are independently H, CH$_3$, C$_2$H$_5$, OCH$_3$ or OC$_2$H$_5$;
R$^4$ and R$^5$ are independently H, CH$_3$ or C$_2$H$_5$;
X is H, OH;
Y is hydrogen or the following poly-isopropoxy chain

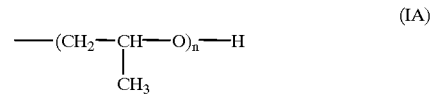

wherein n is between 1 and 4; or of their concentrated compositions having a high dry titre in organic solvents, containing from 40 to 100% by weight of said azoic dyes.

2. The method according to claim 1, wherein in the formula (I) compounds R$^1$ is the —C$_{12}$H$_{25}$ aliphatic radical or sec.-butyl, the R$^2$ and R$^3$ substituents are independently hydrogen, CH$_3$, OCH$_3$; R$^4$ is hydrogen and X is hydrogen or OH, R$^5$ is hydrogen, Y is H or the radical of formula 1a wherein n is between 1 and 3.

3. The method according to claim 1, wherein the organic solvent of the compositions having a high dry titre is selected from aromatic hydrocarbons having from 7 to 15 carbon atoms, optionally containing one or more C$_1$–C$_4$ aliphatic chains, and mixtures thereof, or solvents comprising in their molecule one or more functional groups containing oxygen, wherein oxygen is bound by simple covalent bonds and/or with double bond=0.

4. The method according to claim 3 wherein the organic solvent is selected from: xylene, alkylnaphthalenes, an aromatic hydrocarbon mixture having from 10 to 11 carbon atoms, 2-butoxyethanol, butylcellosolve acetate and diacetonalcohol.

5. The method according to claim 1, wherein the formula (I) compounds are extracted from the oil product by acid solutions of strong, inorganic and/or organic acids, having the following composition (the percentages are by volume %):
from 5 to 90% of an aqueous solution of a strong acid, having a molarity equal to or higher than 0.5 M;
from 95 to 10% of an hydrosoluble organic solvent.

6. The method according to claim 5 wherein the hydrosoluble organic solvent is selected from alcohols, polyols, ethers alcohols, dimethylformamide and dimethylsuphoxide.

7. The method according to claim 5 wherein a salt is added in amount from 5 to 20% w/v.

8. The method according to claim 7 wherein the salt is selected from KCl, CaCl$_2$, ZnCl$_2$, ZnSO$_4$ and AlCl$_3$.

9. The method according to claim 1 wherein the markers, or their corresponding concentrated compositions in organic solvents, are added to oil distillation products in amounts ranging from 0.5 to 50 ppm.

10. A compound of formula (IX):

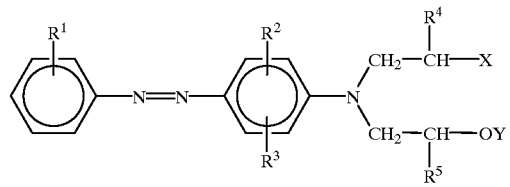

(IX)

$R^1$ is linear or branched alkyl with a number of carbon atoms from 6 to 20;

$R^2$ and $R^3$ are independently H, $CH_3$, $C_2H_5$, $OCH_3$ or $OC_2H_5$;

$R^4$ and $R^5$ are independently H, $CH_3$ or $C_2H_5$;

X is H, OH, provided that X is H when $R^1$ is a linear or branched alkyl with six carbon atoms;

Y is hydrogen or the following poly-isopropoxy chain

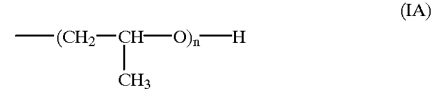

(IA)

wherein n is between 1 and 4.

11. A concentrated composition comprising the compound of claim 10 having high dry titre in organic solvents, containing from 40 to 100% by weight of said azo dyes.

\* \* \* \* \*